United States Patent [19]
Stridsberg

[11] Patent Number: 5,267,478
[45] Date of Patent: Dec. 7, 1993

[54] DEVICE FOR A RAPID POSITIONING OF A HEAVY CARRIAGE

[75] Inventor: Lennart Stridsberg, Stockholm, Sweden

[73] Assignee: Mytronic AB, Enskede, Sweden

[21] Appl. No.: 927,790

[22] Filed: Aug. 10, 1992

Related U.S. Application Data

[63] Continuation of Ser. No. 623,735, Dec. 13, 1990, filed as PCT/SE89/00398, Jul. 7, 1989, abandoned.

[30] Foreign Application Priority Data

Jul. 8, 1988 [SE] Sweden .................. 8802598
Mar. 13, 1989 [SE] Sweden .................. 8900886
Jul. 7, 1989 [WO] PCT Int'l Appl. .................. PCT/SE89/00398

[51] Int. Cl.[5] .................. G05G 11/00; F16H 19/04; F16H 19/06
[52] U.S. Cl. .................. 74/89.17; 74/89.22; 74/409; 74/661; 74/665 B; 92/88; 92/165 R; 92/165 PR; 318/593
[58] Field of Search .......... 74/89.17, 89.2, 89.21, 74/89.22, 479, 661, 665 A, 665 B, 409; 318/373, 578, 592, 593; 364/182; 92/88, 165 R, 165 PR

[56] References Cited

U.S. PATENT DOCUMENTS

| | | | |
|---|---|---|---|
| 2,307,339 | 1/1943 | Szegö et al. | 74/89.17 X |
| 2,902,875 | 9/1959 | Finally et al. | 74/661 X |
| 3,310,998 | 3/1967 | Harmening | 74/661 |
| 3,398,595 | 8/1968 | Clutter | 74/409 |
| 3,512,425 | 5/1970 | Endo | 74/409 |
| 3,762,232 | 10/1973 | Müller | 74/89.22 |
| 3,850,043 | 11/1974 | Tarbox | 74/89.2 |
| 4,208,930 | 6/1980 | Hermann | 74/479 X |
| 4,266,444 | 5/1981 | Anderson et al. | 74/661 |
| 4,270,404 | 6/1981 | Murakoshi et al. | 74/89.17 X |
| 4,488,477 | 12/1984 | Miyamoto | 92/255 X |
| 4,543,638 | 9/1985 | Scarffe | 364/182 X |
| 4,818,169 | 4/1989 | Schram et al. | 92/88 X |

FOREIGN PATENT DOCUMENTS

| | | | |
|---|---|---|---|
| 3511468 | 10/1986 | Fed. Rep. of Germany | 74/89.22 |
| 56-42758 | 4/1981 | Japan | 74/89.2 |
| 59-23151 | 2/1984 | Japan | 74/89.17 |
| 62-23389 | 1/1987 | Japan | 318/592 |
| 663171 | 11/1987 | Switzerland . | |

*Primary Examiner*—Allan D. Herrmann
*Attorney, Agent, or Firm*—Townsend and Townsend Khourie and Crew

[57] ABSTRACT

A device for the rapid precision positioning of a heavy carriage employs stationary positioning bar, for instance a part of a linear electric motor or a gear rack, and a cooperating moving part of the linear motor or a motor attached to the carriage. The carriage is rapidly and roughly displaced with a further drive which may be constituted by a further gear wheel that cooperates with a gear rack and is driven by a separate motor attached to the carriage. This further drive additionally delivers a certain force for the final positioning in such a way that the play between the gear wheel and the gear rack is eliminated by biasing. Instead of a second gear wheel together with its motor a toothed belt, also driven by a separate motor, a pneumatic cylinder or a linear motor may be used. These are mounted separately from the carriage and ar principally fixed in space.

58 Claims, 4 Drawing Sheets

Prior art  Fig. 1
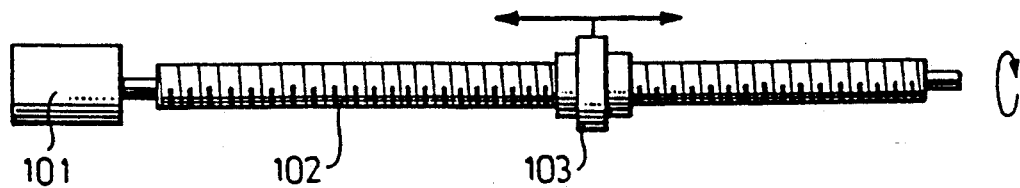
Prior art  Fig. 2
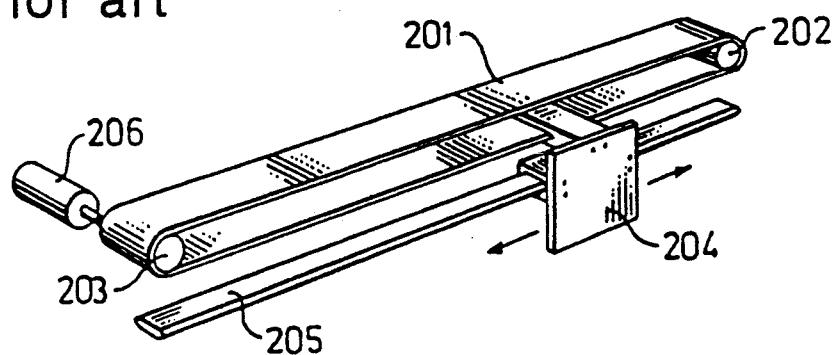
Prior art  Fig. 3
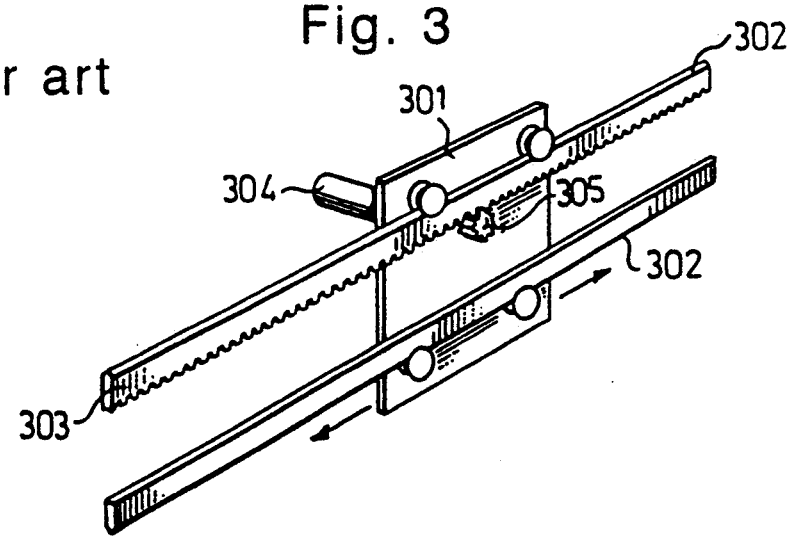

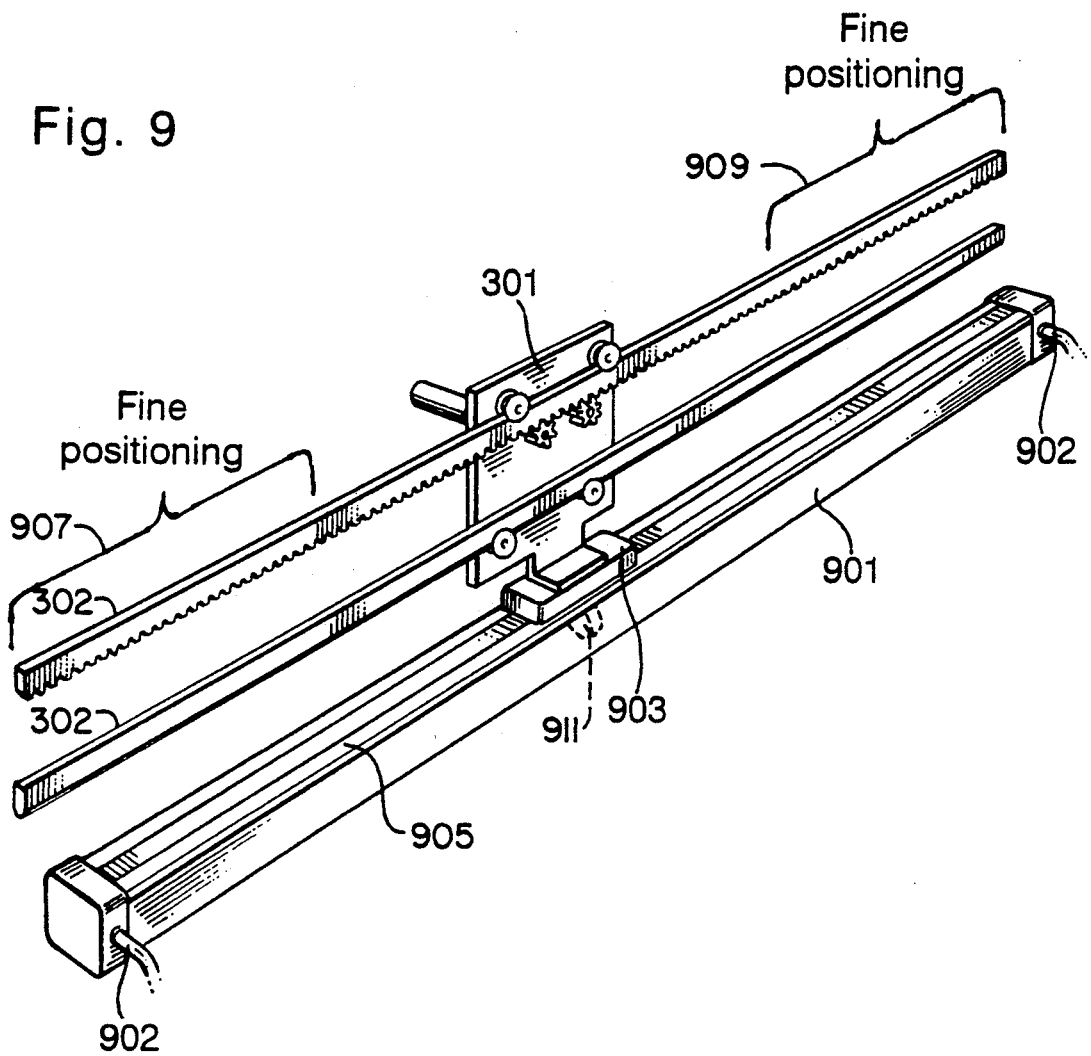

DEVICE FOR A RAPID POSITIONING OF A HEAVY CARRIAGE

This is continuation of application Ser. No. 07/623,735 filed Dec. 13, 1990, filed as PCT/SE89/00398, Jul. 7, 1989, now abandoned.

BACKGROUND OF THE INVENTION

The present invention relates to a device for, very rapidly and with a very high precision (some tenth of micrometers), being able to position, relatively heavy carriages (several kilograms) along a relatively long path, (more than 1 m).

Such movements are required in all possible machining tools and robots. This requirement is naturally greater in machinery where a large number of operative steps, which each takes a short time, shall be performed for positions which are maintained very exactly. An example are picking robots, where a picking head is arranged to fetch various types of components from a large number of possible places and deliver these to a large number of different places with a high precision.

The conventional art for such displacements is a screw and a belt.

Screw driven systems (see FIG. 1) use a stationary motor 101, a rotatable but otherwise stationary (ball) screw 102, which is driven by said motor 101, and a (ball) nut 103, which when said screw is rotated runs along said (ball) screw. Screw driven systems have no large problems for low speeds and short displacements. For high speeds and long displacements there are three cooperating disadvantages:

1) The critical number of revolutions: Because said screw is only supported in its ends, it will be unstable, if the number of revolutions will exceed a certain value. This value can be increased if the diameter is increased.

2) The pitch: the greater displacement the nut will do along said screw for each revolution, the lower number of revolutions is required for a certain speed. The pitches are, becayse of practical reasons, at most equal to the diameter of the screw, whereby a large pitch will give a large diameter.

3) The moment of inertia: For large diameters and long screws the moment of inertia of the screw will be an obstacle to obtaining high rotational speeds.

Belt driven systems (see FIG. 2) have a belt 201 in a closed loop about two rollers 202 and 203 and a carriage 204 running on a separate linear guide 205. The driving is accomplished through a motor 206. By activation of the motor 206, the axis of the motor 206 and the pulley 203 can be rotated. An angular movement of the axis of the motor 206 will cause a linear movement of the carriage.

Belt driven systems are limited by the elasticity of the belt. When the motor 206 produces a torque, the belt 201 will be extended, which will give an elastic offset between the angular position of the axis of said motor 206 and the position of the load/carriage 204. If the elasticity of the connection between the motor 206 and the carriage 204 was negligible, a change of the torque provided by the motor 206 would immediately create a corresponding change of the force acting at the carriage 204. However, due to the elasticity of the belt 201, a change of the torque provided by the motor 206 will not immediately influence the carriage 204 because the belt will initially elastically elongate before a force acting on the carriage 204 will displace it. Due to this and to the accompanying elastic swinging movements the time required to a obtain a precise position of the carriage will be substantially increased.

Another problem of belt drives is friction/slip. If the belt is a toothed belt the biasing force required to reduce the elasticity because of loop formation will produce large friction; if the belt is a steel belt a slip may be produced between the belt and the rollers 202/203, which will produce an offset between the angular position of the axis of said motor 206 and the position of the load/carriage 204, this offset meaning that that there will not a direct correspondence of the angular position of the motor axis to the position of the carriage.

A possible method which however, as far as is known, seldom is used for the combination of a high speed and a high precision is a stationary gear rack and a motor located on the carriage according to FIG. 3. A carriage 301 runs along a linear guide 302 arranged in some way, in which there is a stationary gear rack 303. On said carriage 301 there is a motor 304 having a gear wheel 305. To move the carriage 301 the motor shaft is rotated, which through said gear wheel 305 will force a movement of said carriage 301. The elasticity may be made neglectable because the motor shaft and the gear wheel 305 are extremely more strong and shorter than said belt 201. The gear rack 303 can be attached to the frame of the apparatus (not drawn in order not to obscure the other elements) at very short distances. A slip may not occur. The moment of inertia is known and significantly much smaller than for large, long ball screws.

An apparent disadvantage in this method is that the mass of the driving motor is added to the mass of the carriage. If high accelerations and speeds are required the driving motor will form a dominating part of the mass of the carriage. This will increase the power requirement and will entail increased costs by a need for a stronger guiding path and a stronger frame. (The frame must be constructed in such a way that it is able to resist the acceleration forces without unacceptable vibrations.) Another problem in this method is that the play between a gear rack and a gear wheel must be eliminated for the final positioning. This may be performed with double biased gear wheels. In order to operate with large torques required for a rapid positioning this will give high surface pressures and a rapid wear.

A device for the transport and positioning of work pieces is previously known from the embodiment shown in FIG. 6 and the associated part of the description in CH A 5 663 171. In this prior device carriages are displaced carrying work pieces on a path by means of exterior friction rollers. These friction rollers are rotatably mounted to the frame of said machinery. For the final and fine positioning of said carriages a gear rack segment is used placed on said carriage and an exterior gear wheel which is rotatably mounted to the frame of the machinery. The friction rollers and the gear wheels are motor driven. In such a system not very large running speeds or high positioning retardations can be achieved.

The problems in the prior methods and devices described above are eliminated by the invention.

SUMMARY OF THE INVENTION

The invention is based on the idea of providing said carriage with a local motor which will follow the movable carriage and to combine this with other means to reduce or eliminate the drawbacks of local motors, primarily the mass of the local motor and the play which is produced when a local motor connects its power to the stationary frame by means of a gear rack or similar devices.

The local motor according to the invention may either be a linear electric motor having one part mounted on the carriage and another part mounted on the frame of the machinery, or a rotation motor having rotating elements mounted on the carriage, which cooperate with a stationary positioning bar. The positioning bar may in the longitudinal direction have periodical recesses and/or elevated portions and the cooperating rotating element will then have a corresponding design. In certain cases a smooth bar may be used with cooperating, strongly pressed rollers, which are attached to said carriage. In the preferred embodiment the positioning bar is a gear rack, e.g. identical to that of the system according to FIG. 3, alternatively a stationary ball screw with a rotating nut, which is mounted on the carriage. The gear rack with its associated gear wheels will offer the large rigidity which is valuable for the final positioning and the freedom of slip.

In the invention is used, however, besides the local motor, at least another means for giving the carriage 301 lateral forces. This means has two purposes:

To give large forces for acceleration and retardation.

To give a certain force for the final positioning in order to, by means of a bias, eliminate the play, which in the majority of the embodiments will be produced in the connection between a local rotation motor and the positioning bar. As an example can be mentioned the play between e.g. the gear wheel 305 and the bar 303.

The requirements of this extra means are thus much lower than in positioning systems generally. The elasticity for instance has no importance. The requirement of very short response times is much lower.

As examples of such means can be mentioned:

A band (alternatively a belt, a tooth belt, a chain or similar devices) (201), which is driven by a motor, which is attached to e.g. the frame of the machinery. It may be relatively elastic and thus light and may have a moderate bias and thus a moderate friction.

Another gear wheel such as 305 having another motor 304.

A pneumatic cylinder without a piston rod having an elastic seal permitting a direct mechanical connection through the cylinder wall from the piston to the load like, for example, those manufactured by ORIGA CYLINDRAR AB, Sweden.

A pneumatic cylinder having a magnetic coupling through the cylinder of the force between the piston and the carriage.

The invention permits a rapid and precise positioning relative to a frame of a heavy carriage moving along a path by providing the carriage with at least two forces acting in parallel with said path. The first force is normally comparatively small but can change rapidly and it is derived from a local motor which accompanies the movable carriage. The first force acts between the carriage and the frame by the use of a means having a low elasticity but not necessarily without a play. The second force is normally larger than the first force but cannot easily change rapidly and it is derived from a motor which normally is mounted on the frame. The second force acts between the carriage and the frame by the use of means which does not necessarily have a low elasticity.

The invention thereby will maintain the advantageously rigid connection which is possible between a local motor and a frame while it eliminates some of the drawbacks of local motors. These drawbacks include small accelerations due to the mass of the local motor and the play which is produced when local motors connect their power to the stationary frame by means of a gear rack or similar device.

Thus the invention relates to a device for a rapid positioning of a heavy carriage. The carriage is finely positioned by means of a fixed stationary positioning bar, e.g. a part of an electric motor or a gear rack, and a cooperating motor attached to the carriage. For the case including a gear rack said motor is provided with gear wheels for engagement with the gear rack. The carriage is rapidly and roughly displaced by means of another means. This another means can be constituted by another gear wheel, which cooperates with a gear rack and is driven by a separate motor, which is also mounted on the carriage. This further means will also give a certain force for the final positioning in such a way that the play between the gear wheel and the gear rack is eliminated by means of biasing. Instead of a second gear wheel a toothed belt, a pneumatical or another linear motor may be used. In these cases these are located separately from the carriage and principally fixed in space. Also combinations of two gear wheels and a further exterior means is a possible embodiment.

For the case including two separate motors these are controlled by a control device which is arranged in such a way that the desired operation is obtained. Thus the motors, for a rapid displacement of the carriage, are driven in such a way that both motors will cooperate in the displacement, i.e. in such a way that both motors act on the carriage with forces which during the large part of this step are directed in the same direction. In this rapid movement the power required for the transport is thus mainly delivered by the second motor acting on the further means. In the positioning of the carriage the motors are instead driven in such a way that they, during the large part of this step, counteract each other. In this way possible plays may be eliminated.

For the case including two separate motors mounted on the carriage and a second exterior driving element driven by its own separate motor, these motors are controlled by a control device which is designed in such a way that the suitable operation is obtained. Thus all motors are driven, for a rapid displacement of the carriage, in such a way that they all during the large part of this step cooperate for the displacement, i.e. in such a way that all motors act on the carriage with forces being directed in the same direction. In the rapid movement the power required is delivered mainly by the motor acting on the exterior transport means. In the positioning of the carriage the motors are instead driven in such a way that the further means will be essentially inactive while the motors which are placed on the movable carriage instead, during a large part of this step, counteract each other. In this way the possible play will be eliminated.

The positioning bar may not be a whole bar being arranged along the total path of the carriage. Only suitable segments of this may be arranged in the case that the rapid displacement is being performed by an exterior means which is not placed on the carriage.

In many applications the precision requirement is high only for some parts of the heavy carriage path. An example of this can be pick-and-place robots, where the required precision in the pick-up area is much lower than in the placement area. In some cases positioning does not occur in some segments of the path. It can, in such cases, be advantageous to use the local motor only in some parts of the path. This could reduce the cost of linear motor stators by providing stators on the segments of the path requiring high precision.

BRIEF DESCRIPTION OF THE DRAWINGS

The invention will now be described with reference to the accompanying drawings, on which FIG. 1 shows a prior art system having a ball screw for positioning of work pieces, FIG. 2 shows a prior belt driven system for positioning, FIG. 3 shows a prior art system having gear wheels and gear rack for the positioning, FIG. 4 schematically shows an embodiment of the invention for the rapid displacement and the fine positioning of a carriage, FIG. 5 schematically shows how the play can be compensated.

FIG. 9 shows a device similar to that in FIGS. 6 and 7 but with a pneumatic cylinder.

DESCRIPTION OF THE PREFERRED EMBODIMENTS

Figure 4:
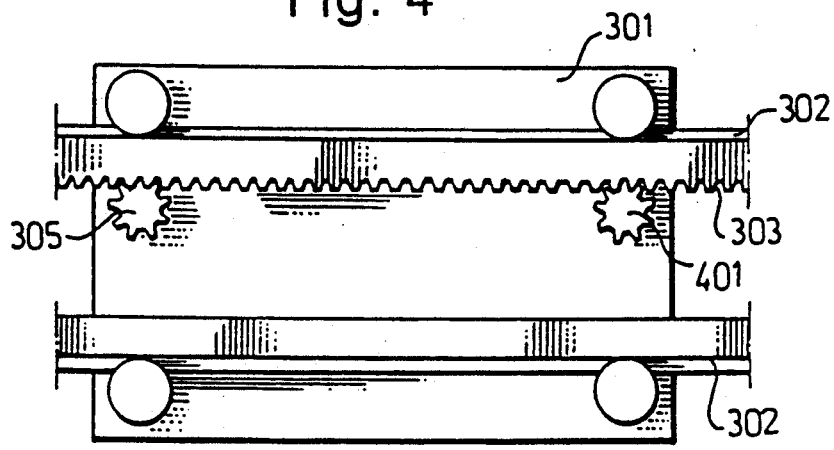

An embodiment of the invention can be seen in FIG. 4. According to the invention two gear wheels 305 and 401 are used, as is seen in FIG. 4. These two gear wheels can be given torques, which are at least partly independent of each other, for instance by the fact that they are driven by two independent motors. For a rapid displacement from one position to another first both motors will give a torque in the same direction in order to accelerate the carriage and then give a torque in the same but the opposite direction in order to brake the carriage. Up to now the gear play between the bar 303 and the gear wheels 305/401 has been unimportant.

When the carriage has arrived near its target all plays will entrain problems; therefore now both motors are given different torques in such a way that (according to FIG. 5) the gear play will disappear. When the carriage is almost still standing, the carriage can be maintained "locked" by the fact that the two wheels 401 and 305 are given smaller torques but in the opposite directions.

Figure 6:
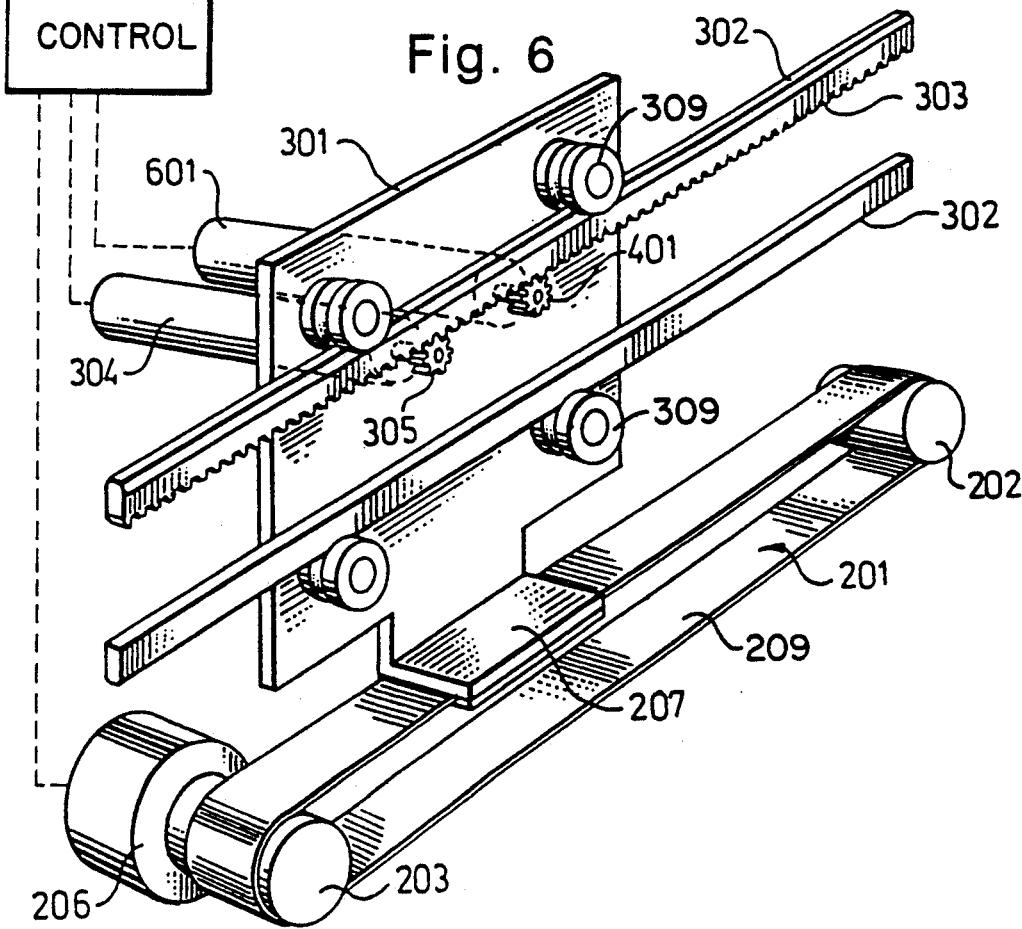
FIG. 6 shows another embodiment of the invention having an exterior belt driven means.

FIG. 6 shows another embodiment of the invention. The figure is totally schematical in order to show the elements principally. In this case an element 201 is used to give the carriage 301 extra forces laterally. The element 201 can be a band, a belt 209, a cable, a wire, a chain, a V-belt or similar devices. For the purpose that the operation will be more easily followed in the text it will in the following be called a "belt". By the fact that said belt 201 can be relatively elastic without making the controlling properties significantly worse it may be made relatively light.

FIG. 6 also illustrates a control device 602 for controlling the direction and speed of the two motors. For rapid displacement of carriage 301, control device 602 causes the motors to operate in the same direction. During positioning of carriage 301, control device 602 causes the motors to act in opposite directions, thereby eliminating play.

The element (belt) 201 runs in a closed loop around the two rollers (alternatively pulleys/gear rings/toothed wheels) 202 and 203. The driving is produced by means of one or several motors 206 driving one or both of the wheels 202 and 203. The belt 209 is in some way attached to the carriage 301 by means of an element 207.

The carriage 301 has one or two local motors with a rigid connection between the carriage and the frame. In FIG. 6 the carriage 301 is supported on wheels 309 which run linear guide 302, in which there is a stationary gear rack 303. On the carriage 301 there is a motor 304 having a gear wheel 305 and possibly a further motor 601 with its associated gear wheel 401. In order to displace the carriage 301 the motor shaft is rotated, which through the gear wheel 305 will force a movement of the carriage 301. The elasticity between partly the carriage 301 and its motor 304 and partly the frame and its gear rack 303 is very small, because the gear rack can be attached to the machinery frame (not drawn in order not to obscure the remaining elements) at very short distances, and since the elasticity of the gear rack, the gear wheel and the motor shaft is small. A change of the torque delivered by the motor 304 will therefore produce a nearly immediate change of the force which, through the, motor bearing, may be given to the carriage 301. In acceleration and brakings large acceleration and breaking forces are delivered by means of the belt 201. The motor 304 (and possibly also 601) are used during the braking step partly for correcting the transport of the carriage towards the final position. If for instance the braking because of friction and belt force will be too great, in certain short time intervals the local motor (S) will tend to accelerate the carriage in order to restore it to a correct run towards the target.

In those cases when the gear play is large and only one motor 304 is used, the motor 206 is given, after the target has been achieved, a weak torque in such a way that the gear play between 303 and 305 is eliminated. In many embodiments this will however take some extra time because of elasticities and inertia of the belt 201.

The path may have stations where the heavy carriage is accurately positioned, and regions between the stations, where the heavy carriage is to be rapidly displaced. Using such stations, the first motor would normally be activated only in the neighborhood of the stations and would idle or contribute very little force required to rapidly displace the carraige in the regions between stations.

Figure 5:
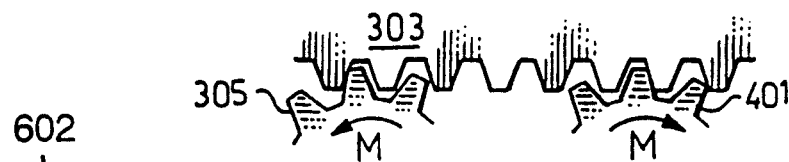

By the addition of a further motor 601 and the associated gear wheel 401 the correction of the run can be performed according to the same principles as are described with reference to the embodiment according to the figures 4 and 5. By this way a very high precision may be obtained immediately after the positioning.

Figure 7:
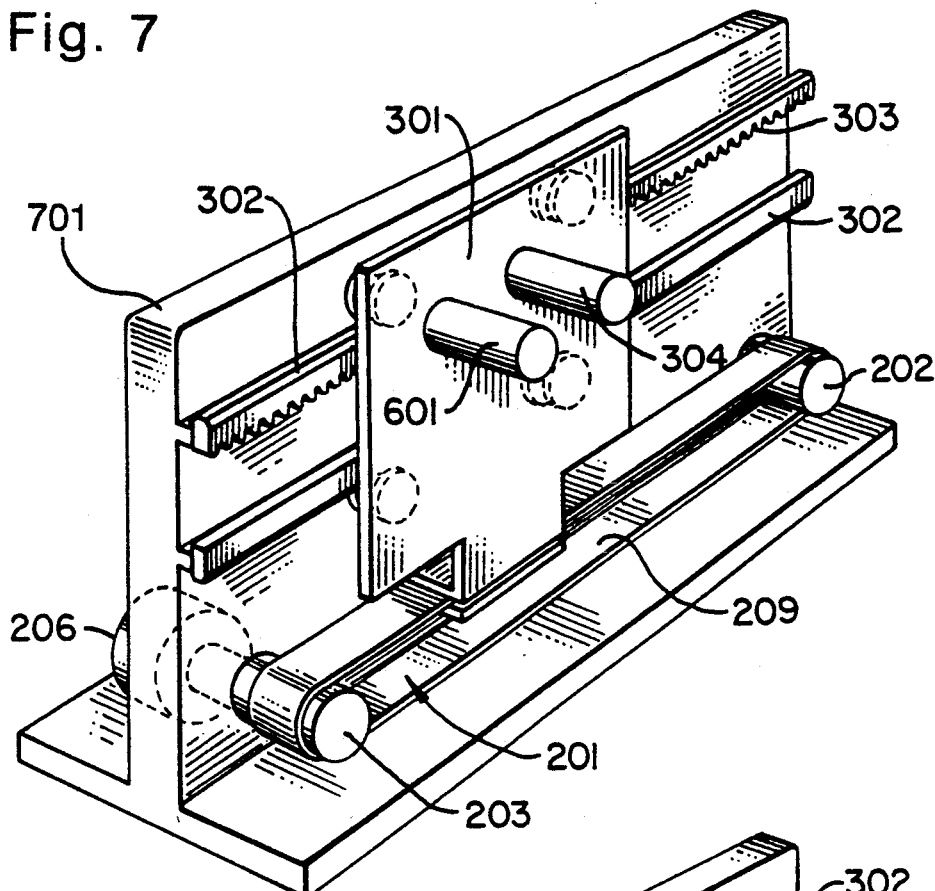
FIG. 7 shows a device similar to that shown in FIG. 6 mounted on a frame.

FIG. 7 shows the same device as is shown in FIG. 6 but also includes a frame 701. Frame 701 supports the illustrated fixed components of the device. They bear the same reference numerals and are the same components as are shown in FIG. 6. They are, therefore, not again described here.

Figure 8:
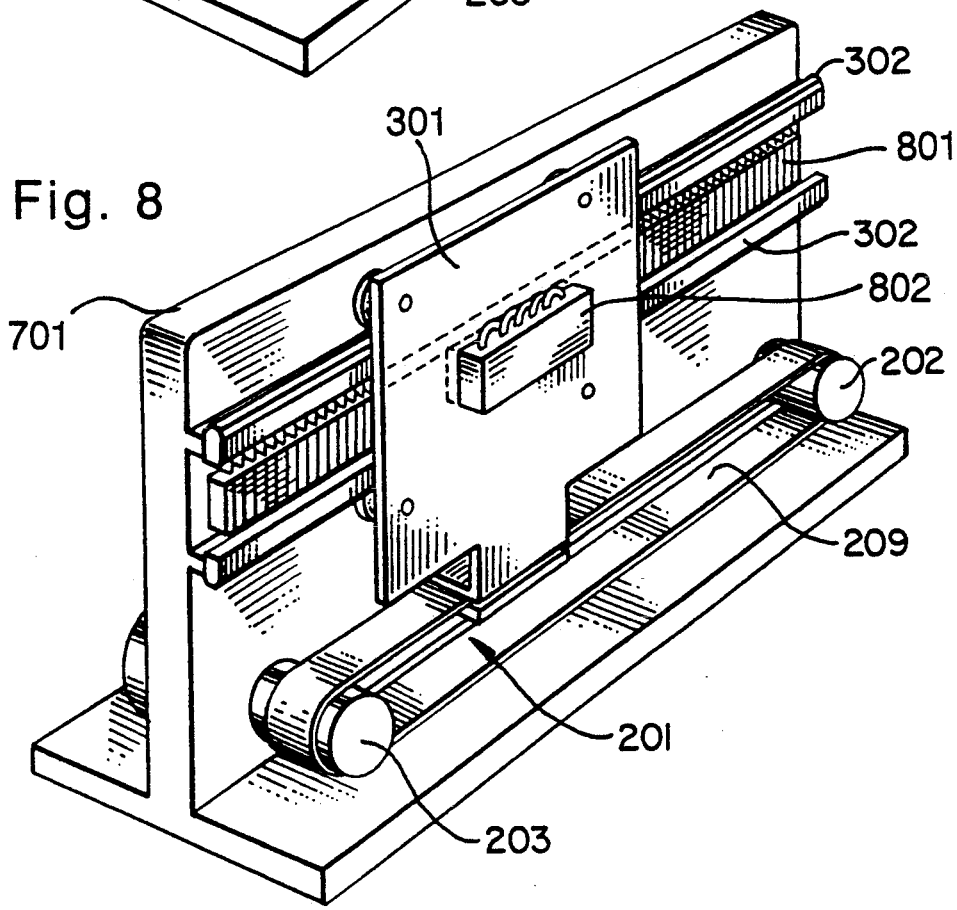
FIG. 8 shows a device similar to that shown in FIGS. 6 and 7 but with an electric linear motor.

FIG. 8 shows an embodiment of the device having a linear motor as the local motor accompanying the heavy carriage 301. The linear motor includes a stator 801 which is attached to the frame and serves as the positioning bar. A moving part 802 of the linear motor is mounted on the heavy carriage. The remaining reference numerals shown in FIG. 8 refer to the same components as are shown in FIG. 6. They are, therefore, not repeated herein.

FIG. 9 illustrates a further embodiment of the device having a pneumatic cylinder 901 instead of the rotary motor 206 and the belt 207 (as shown in FIG. 6) as the rapid displacement motor. The pneumatic cylinder 901 includes connections 902 to a source of pressurized fluid (not shown). In the preferred embodiment, pneumatic actuator 901 comprises a rod-less piston 911 which is movable along the interior of the cylinder. In one embodiment of the invention, there is a part 903 mechanically attached to the piston so that it moves with the piston. Part 903 is also attached to heavy carriage 301 so that it moves the carriage when the piston is activated. Alternatively, the pneumatic actuator 901 can be provided with a magnetic coupling effective through cylinder wall 905 in which event part 903 is a magnetic part which accompanies the movements of the piston, is attached to the heavy carriage, and thereby moves the heavy carriage with the piston. FIG. 9 also shows two areas 907, 909 where a fine positioning of the carriage is required.

I claim:

1. A device for the rapid positioning of a heavy carriage, the heavy carriage being guided along a path, comprising:

first means for displacing the carriage, the first means comprising a stationary positioning bar arranged parallel with said path and rigidly attached to a frame of the device, and a first motor cooperating with said positioning bar via first force-transferring means for subjecting the carriage to a first force for displacing the carriage along the positioning bar, and second means for displacing the carriage comprising a second motor acting on the carriage via second force-transferring means for subjecting the carriage to a second force, the first motor being a local motor accompanying said carriage, the first force-transferring means and the positioning bar providing relatively high rigidity for use during fine positioning of the carriage, the first and second motors being separate motors, and the device being arranged in such a way that the forces, to which the carriage is subjected when the first and second motors are simultaneously activated, are collinear.

2. A device according to claim 1 wherein
the first force is small in comparison with the second force,
the first force-transferring means, through which the first motor acts on the positioning bar, comprises comparatively stiff mechanical elements adapted to permit a rapid change of the first force, and
the second force-transferring means, through which the second motor acts on the heavy carriage, comprises comparatively more resilient mechanical elements,
whereby the total force acting on the carriage and composed of the first and the second forces will have a considerable magnitude for a rapid displacement of the carriage and is able to change rapidly for the fine positioning of the carriage.

3. A device according to claim 1 wherein
said path comprises stations where the carriage is to be accurately positioned, and regions between the stations where the carriage is to be rapidly displaced, and wherein
the first motor is activated only when the carriage is proximate the stations and idles when the carriage is in the regions between the stations so that it contributes very little to the force required to rapidly displace the carriage.

4. A device according to claim 1 including a control device for controlling the motors such that for a rapid displacement of the carriage the motors are driven so that both motors cooperate during a major part of the rapid displacement by acting on the carriage with forces which are directed in the same direction, the power required for the rapid positioning of the carriage is probided mainly by the second motor, and so that during the fine positioning of the carriage the motors are driven such that during a major part of the fine positioning the motors counteract each other to thereby eliminate play.

5. A device according to claim 1 wherein the second motor also is a local motor accompanying said carriage.

6. A device according to claim 5 wherein the second motor cooperates with a stationary positioning bar arranged in parallel with said path and is rigidly attached to a frame of the device.

7. A device according to claim 5 including a control device for controlling the first and second motors so that for a rapid displacement from one position to another position both motors act on the carriage with forces having the same direction, and for a fine positioning at a desired destination position the motors act on the carriage with forces having opposite directions.

8. A device according to claim 1 wherein the second motor is rigidly mounted on a frame of the device.

9. A device according to claim 7 including a third separate motor, which also is a local motor accompanying said carriage and cooperating with a stationary positioning bar, arranged in parallel with said path and rigidly attached to a frame of the device.

10. A device according to claim 9 including a control device for controlling said motors and arranged so that for a rapid displacement of the carriage all motors cooperate and are driven such that all motors during a major part of this displacement act on the carriage with forces which are directed in the same direction and such that the power required for the rapid displacement of the carriage is primarily delivered by the second, rigidly mounted motor, and so that for the fine positioning of the carriage the motors are driven to maintain the second motor substantially inactive while the first and third motor during a major part of the fine positioning act on the carriage with forces which counteract each other to eliminate possible play.

11. A device according to claim 1 wherein the first motor comprises a movable part of a linear electric motor and mounted on the carriage, and wherein the positioning bar constitutes a stator of said linear motor.

12. A device according to claim 1 wherein the first motor is a rotation motor and the first force-transferring means comprise a first element driven by said motor and rotatably mounted on the carriage.

13. A device according to claim 12 wherein the positioning bar comprises a gear rack and the first rotating element comprises a gear wheel.

14. A device according to claim 1 wherein the second force-transferring means comprises a gear wheel cooperating with a gear rack and rotatably mounted on said carriage.

15. A device according to claim 1 wherein the second force-transferring means comprise a belt driven by the second motor attached to a frame, the frame supporting the device.

16. A device according to claim 1 wherein the second motor and the second force-transferring means comprise a pneumatic cylinder attached to a frame supporting the device.

17. A device according to claim 16 wherein the pneumatic cylinder is of the type having no piston rod.

18. A device according to claim 1 wherein the pneumatic cylinder includes a cylinder wall and means defining a magnetic coupling effective through the cylinder wall for transmitting the forces acting between the piston and the carriage.

19. A device for rapid positioning of a heavy carriage along a path, comprising:
    a stationary frame,
    a rigid stationary positioning bar attached to said frame,
    a carriage movable along said path,
    a first force producing means which accompanies said carriage, said first force producing means acting upon a first force transferring means, said first force transferring means imparting a first force upon said carriage, said first force transferring means acting upon said stationary positioning bar to produce said first force,
    a second force producing means acting upon a second force transferring means which imparts a second force on said heavy carriage, and
    a control device for controlling the direction and magnitude of said first and second forces, said control device causing said first and second force producing means to produce said first and second forces to act in the same direction for rapid displacement of said carriage, said control device further causing said first and second force producing means to produce said first and second forces acting in opposite directions for fine positioning of said carriage, whereby possible play in said first and second force transferring means is reduced.

20. The device according to claim 19, wherein said first force transferring means comprises relatively stiff mechanical elements, and said second force transferring means comprises relatively resilient mechanical elements.

21. The device according to claim 19, further comprising:
    a control device for controlling said first and second force producing means,
    said path comprising stations where said heavy carriage is accurately positioned, and inter-station regions where said heavy carriage is rapidly displaced, and
    said control device causing said first force producing means to be activated primarily near said stations and causing said first force producing means to contribute relatively little force in said inter-stations regions.

22. The device according to claim 19, wherein said second force producing means comprises a motor which accompanies said carriage.

23. The device according to claim 22, wherein said second motor acts upon said positioning bar thereby producing said second force.

24. The device according to claim 19, wherein said second force producing means comprises a motor mounted on said frame.

25. The device according to claim 19, further comprising:
    a means for producing force comprising a third motor which accompanies said carriage and acts upon a third force transferring means which imparts a third force upon said carriage.

26. The device according to claim 25, further comprising:
    a control device for controlling said first, second and third force producing means,
    said control device causing said first, second and third force producing means to produce force in the same direction for rapid displacement of said carriage,
    said control device causing said second force producing means to be used primarily for rapid displacement of said carriage, and
    said control device causing said first and third force producing means to counteract each other, whereby possible play is eliminated for positioning of said heavy carriage.

27. The device according to claim 19, wherein said first force producing means comprises a linear electric motor, said linear motor comprising a movable part mounted on said carriage, and said positioning bar comprising a stator of said linear motor.

28. The device according to claim 19, wherein said first force producing means comprises a rotation motor which acts upon said positioning bar through an element, said element being rotatably mounted to said carriage and being driven by said rotation motor.

29. The device according to claim 19, wherein said positioning bar is a gear rack and said first force transferring means comprises a gear wheel.

30. The device according to claim 19, wherein:
    said second force transferring means comprises a gear wheel rotatably mounted on said carriage,
    said positioning bar comprises a gear rack, and
    said gear wheel acting upon said gear rack producing said second force.

31. The device according to claim 19, wherein:
    said second force producing means comprises a motor attached to said frame which supports said device, and
    said second force transferring means comprises a belt.

32. The device according to claim 19, wherein said second force producing means comprises a pneumatic cylinder.

33. The device according to claim 19, wherein said second force producing means comprises a pistonrodless pneumatic cylinder.

34. The device according to claim 19, wherein:
    said second force producing means comprises a pneumatic cylinder having magnetically coupled first and second active parts,
    said first active part being attached to an interior piston of said pneumatic cylinder,
    said second active part being attached to said carriage, and
    said first and second active parts being magnetically coupled through a cylinder wall of said pneumatic cylinder.

35. A device for rapid and precise positioning of a heavy carriage along a path, comprising:

first and second motors which accompany said heavy carriage;

first and second force transferring means to transfer forces from said first and second motors, respectively, to said heavy carriage, said first and second force transferring means comprising a gear wheel acting upon a stationary gear rack which is rigidly attached to a frame of the device; and a control device which controls said first and second motors, said control device causing said first and second motors to act in the same direction for rough positioning of said carriage, and causing said first and second motors to act in different directions for fine positioning of said heavy carriage whereby possible play and/or slip is reduced in said first and second force transferring means.

36. A device for a rapid and precise positioning of a heavy carriage along a path, comprising:

first and second motors, said first motor accompanying said heavy carriage and providing a small force in relation to said second motor, first and second force transferring means which transfer forces from said first and second motor, respectively, to said heavy carriage, said first force transferring means comprising a gear wheel acting upon a stationary gear rack which is rigidly attached to a frame of the device whereby said first force transferring means has a relatively low elasticity and/or slip compared to said second force transferring means, said low elasticity enabling said first motor to change speed rapidly in relation to said second motor without incurring errors in positioning.

37. A device for a rapid and precise positioning of a heavy carriage along a path, comprising:

first and second force producing means, said first and second force producing means acting through first and second force transferring means, respectively, producing first and second forces, respectively, on said carriage, said first force being small in relation to said second force, said first force producing means comprising a linear motor which accompanies said carriage and which has a movable part attached to said heavy carriage, a control device for controlling said first and second force producing means, said first force transferring means comprising a stator for said linear motor attached to a frame of said device, having a relatively low elasticity whereby said first force is able to change rapidly without incurring slip, said second force transferring means having a relatively larger elasticity than said first force transferring means.

38. A device according to claim 37, wherein said second force transferring means comprises a belt.

39. A device according to claim 37, wherein said second force producing means is a pneumatic cylinder.

40. A device for rapid and precise positioning of a heavy carriage, the carriage being arranged for movement along a path and the positioning being performed by subjecting the carriage to a first force and a second force, these forces having directions which are parallel to said path, the device comprising a first motor and a second motor, first and second force-transferring means operatively coupled with the first and second motors, respectively, so that the first and second forces are penetrated by the motors, and a control device for controlling the motors, the first motor being a local motor accompanying the carriage, the control device being adapted to control the motors for a rough positioning of the carriage so that the first and second forces generated by the motors act in the same direction and both assist in moving the carriage, and the control device being further adapted to control the motors for a fine positioning of the carriage so that the first force and the second force act in opposite directions to counteract each other and thereby compensate for play in the force-transferring means.

41. A device according to claim 40, wherein the force-transferring means for said first motor is a gear wheel driven by the first motor and a stationary gear rack cooperating with the gear wheel.

42. A device for a rapid and precise positioning of a heavy carriage, the carriage being arranged for movement along a path, the positioning being performed by subjecting the carriage to a first force and a second force, the forces having directions which are parallel to said path and being derived through first and second force-transferring means from a first and second motor respectively, said second force-transferring means having an elasticity, and a control device for controlling the motors, wherein the first force is small in relation to the second force, the first motor is a local motor accompanying the carriage, and the first force-transferring means has a low elasticity in comparison to the second force-transferring means, whereby the first force is able to change rapidly in relation to the second force.

43. A device according to claim 42 wherein the first force-transferring means comprise a gear wheel and a gear rack.

44. A device according to claim 42 wherein the first motor and the first force-transferring means comprise a linear motor having a movable part attached to the carriage and a stator attached to a frame of the device.

45. A device according to claim 42 wherein the second force-transferring means comprise a belt.

46. A device according to claim 42 wherein the second motor is a pneumatic cylinder.

47. A device for a rapid and precise positioning of a heavy carriage along a path, comprising:

first and second means for producing force, said first and second force producing means acting through first and second force transferring means, respectively, producing first and second forces, respectively, on said carriage, said first force being small in relation to said second force, said first force producing means comprising a motor which accompanies said carriage, and a control device for controlling said first and second force producing means, said first force transferring means acting on a relatively rigid bar rigidly attached to a frame of the device whereby said first force is able to change rapidly without incurring slip, said second force transferring means comprising a belt.

48. A device for rapid positioning of a heavy carriage along a path, comprising:

a stationary frame, a rigid stationary positioning bar attached to said frame, a carriage movable along said path, a first force producing means which accompanies said carriage, said first force producing means acting upon a first force transferring means, said first force transferring means imparting a first force upon said carriage, said first force transferring means acting upon said stationary positioning bar to produce said first force, a second force producing means acting upon a second force transferring means which imparts a second force on said carriage, and a third force producing means comprising a motor which accompanies said heavy carriage and acts upon a third force transferring means which imparts a third force upon said carriage.

49. The device according to claim 48, further comprising:

a control device for controlling said first, second and third force producing means, said control device causing said first, second and third force producing means to produce force in the same direction for rapid displacement of said carriage, said control device causing said second force producing means to be used primarily for rapid displacement of said carriage, said control device further causing said first and third force producing means to counteract each other, whereby possible play is eliminated, for positioning of said heavy carriage.

50. A device for rapid positioning of a heavy carriage along a path, comprising:

a stationary frame, a rigid stationary positioning bar attached to said frame, a carriage movable along said path, a first force producing means which accompanies said carriage, said first force producing means acting upon a first force transferring means, said first force transferring means imparting a first force upon said carriage, said first force transferring means acting upon said stationary positioning bar to produce said first force, wherein said first force producing means comprises a linear electric motor, said linear motor comprises a movable part mounted on said carriage, and said positioning bar comprises a stator of said first linear motor, and a second force producing means acting upon a second force transferring means which imparts a second force on said carriage.

51. A device for rapid positioning of a heavy carriage along a path, comprising:

a stationary frame, a rigid stationary positioning bar attached to said frame, a carriage movable along said path, a first force producing means which accompanies said carriage, said first force producing means acting upon a first force transferring means, said first force transferring means imparting a first force upon said carriage, said first force transferring means acting upon said stationary positioning bar to produce said first force, wherein said first force producing means comprises a rotation motor acting upon said positioning bar through a first element, said first element being rotatably mounted to said carriage and being driven by said rotation motor, and a second force producing means acting upon a second force transferring means which imparts a second force on said carriage.

52. A device for rapid positioning of a heavy carriage along a path, comprising:

a stationary frame, a rigid stationary gear rack attached to said frame, a carriage movable along said path, a first force producing means which accompanies said carriage, said first force producing means acting upon a gear wheel imparting a first force upon said carriage and acting upon said gear rack to produce said first force, and a second force producing means acting upon a force transferring means which imparts a second force on said carriage.

53. A device for rapid positioning of a heavy carriage along a path, comprising:

a stationary frame, a rigid stationary positioning bar attached to said frame, a carriage movable along said path, a first force producing means which accompanies said carriage, said first force producing means acting upon a first force transferring means, said first force transferring means imparting a first force upon said carriage, said first force transferring means acting upon said stationary positioning bar to produce said first force, and a motor attached to said frame acting upon a belt which imparts a second force on said carriage.

54. A device for rapid positioning of a heavy carriage along a path, comprising:

a stationary frame, a rigid stationary positioning bar attached to said frame, a carriage movable along said path, a first force producing means which accompanies said carriage, said first force producing means acting upon a first force transferring means, said first force transferring means imparting a first force upon said carriage, said first force transferring means acting upon said stationary positioning bar to produce said first force, and a pneumatic actuator acting upon a second force transferring means which imparts a second force on said carriage.

55. A device for rapid positioning of a heavy carriage along a path, comprising:

a stationary frame, a rigid stationary positioning bar attached to said frame, a carriage movable along said path, a first force producing means which accompanies said carriage, said first force producing means acting upon a first force transferring means, said first force transferring means imparting a first force upon said carriage, said first force transferring means acting upon said stationary positioning bar to produce said first force, and a piston rod-less pneumatic actuator acting upon a second force transferring means which imparts a second force on said heavy carriage.

56. A device for rapid positioning of a heavy carriage along a path, comprising:

a stationary frame, a rigid stationary positioning bar attached to said frame, a carriage movable along said path, a first force producing means which accompanies said carriage, said first force producing means acting upon a first force transferring means, said first force transferring means imparting a first force upon said carriage, said first force transferring means acting upon said stationary positioning bar to produce said first force, and a pneumatic actuator having magnetically coupled first and second active parts and acting upon a second force transferring means which imparts a second force on said carriage, said first active part being attached to an interior piston of said pneumatic actuator, said second active part being attached to said carriage, and said first and second active parts being magnetically coupled through a cylinder wall of said pneumatic actuator.

57. A method for a rapid and precise positioning of a heavy carriage, the carriage being arranged for movement along a path, comprising:

subjecting the carriage to a first force and a second force, the forces having directions which are parallel to said path, rough positioning the carriage with the two forces acting in the same direction so that both assist in the movement of the carriage, and fine positioning the carriage with the first force and the second force acting in opposite directions so that they counteract each other to compensate for possible play and/or slip in the force-transferring means.

58. A method for rapid and precise positioning of a heavy carriage, the carriage being arranged for movement along a path, comprising:

subjecting the carriage to a first force and a second force, the forces having directions which are parallel to said path, the second force being applied to the carriage through force-transferring means having an elasticity and/or slip, wherein the first force is small in relation to the second force and is derived by means of force-transferring means from a local motor which accompanies the carriage, and said force-transferring means have a low elasticity and/or slip in relation to the force-transferring means for the second force, whereby the first force is able to change rapidly in relation to the second force.

* * * * *